(12) United States Patent
Huang et al.

(10) Patent No.: US 12,515,140 B2
(45) Date of Patent: Jan. 6, 2026

(54) BIOMIMETIC WATERFOWL

(71) Applicant: Pioneer Material Precision Tech Co., Ltd., New Taipei (TW)

(72) Inventors: Wei-Yu Huang, New Taipei (TW); Chang-Qi Zhang, New Taipei (TW); Guan-Hao Pan, New Taipei (TW); Li-Yuan Yeh, New Taipei (TW); Tai-Yu Chen, New Taipei (TW); Ching-Hung Liu, New Taipei (TW); Chih-Wei Shen, New Taipei (TW); Ching-Shu Lai, New Taipei (TW)

(73) Assignee: PIONEER MATERIAL PRECISION TECH CO., LTD., New Taipei (TW)

( * ) Notice: Subject to any disclaimer, the term of this patent is extended or adjusted under 35 U.S.C. 154(b) by 162 days.

(21) Appl. No.: 18/529,967

(22) Filed: Dec. 5, 2023

(65) Prior Publication Data
US 2025/0017199 A1 Jan. 16, 2025

(30) Foreign Application Priority Data
Jul. 11, 2023 (TW) ................................ 112125856

(51) Int. Cl.
*A63H 13/02* (2006.01)
*A63H 11/00* (2006.01)
*A01M 31/06* (2006.01)

(52) U.S. Cl.
CPC ............. *A63H 13/02* (2013.01); *A63H 11/00* (2013.01); *A01M 31/06* (2013.01)

(58) Field of Classification Search
CPC ....................................................... A63H 13/02
See application file for complete search history.

(56) References Cited

U.S. PATENT DOCUMENTS

| 109,992 A * | 12/1870 | Hart ...................... A63H 23/10 |
| | | 43/3 |
| 351,709 A * | 10/1886 | Nye ...................... A01M 31/06 |
| | | 43/3 |

(Continued)

OTHER PUBLICATIONS

Search Report appended to an Office Action, which was issued to Taiwanese counterpart application No. 112125856 by the TIPO on Oct. 20, 2023, with an English translation thereof, 2 pages.

*Primary Examiner* — Eugene L Kim
*Assistant Examiner* — Matthew B Stanczak
(74) *Attorney, Agent, or Firm* — HSML P.C.

(57) ABSTRACT

A biomimetic waterfowl includes a housing, two waterfowl legs, and a driving module. The waterfowl legs are spaced apart from each other in a left-right direction and are mounted to a bottom portion of the housing. Each waterfowl leg includes a first segment mounted to the housing and rotatable about a first axis parallel to the left-right direction, and a second segment rotatable about a second axis parallel to the first axis. The driving module is mounted to the housing and is configured to drive the waterfowl legs. Each of the waterfowl legs is movable between a retracted state, where the first segment extends forwardly from the housing and the second segment extends rearwardly from the first segment, and a propelling state, where the first segment extends rearwardly from the housing and the second segment extends rearwardly from the first segment.

12 Claims, 7 Drawing Sheets

(56) References Cited

U.S. PATENT DOCUMENTS

| | | | | |
|---|---|---|---|---|
| 410,523 A * | 9/1889 | Jencks | A01M 31/06 | 24/115 J |
| 636,106 A * | 10/1899 | Biddle | A63H 23/10 | 43/3 |
| 717,790 A * | 1/1903 | Yorke et al. | A01M 31/06 | 446/156 |
| 1,828,034 A * | 10/1931 | Einfalt | A63H 23/10 | 446/158 |
| 2,013,709 A * | 9/1935 | Boissoneau | A63H 13/02 | 446/271 |
| 2,229,175 A * | 1/1941 | Johnson | A63H 23/10 | 43/3 |
| 2,443,040 A * | 6/1948 | Jones | A01M 31/06 | 43/3 |
| 2,591,554 A * | 4/1952 | Kinney | A01M 31/06 | 43/26.1 |
| 2,704,416 A * | 3/1955 | Laird | A63H 23/10 | 43/3 |
| 3,074,195 A * | 1/1963 | Vanderpool | A01M 31/06 | 43/26.1 |
| 3,434,234 A * | 3/1969 | Schleter | A63H 23/10 | 446/158 |
| 3,601,922 A * | 8/1971 | Shaffer | A63H 13/12 | 446/158 |
| 3,628,286 A * | 12/1971 | Mashahiro | A63H 13/12 | 446/158 |
| 3,689,927 A * | 9/1972 | Boston | A01M 31/06 | 213/3 |
| 3,750,833 A * | 8/1973 | Kahl | G05D 1/0227 | 446/442 |
| 3,798,830 A * | 3/1974 | Grieder | A63H 23/10 | 446/158 |
| 3,835,581 A * | 9/1974 | Grieder | A63H 23/10 | 446/158 |
| 4,068,401 A * | 1/1978 | Saitoh | A63H 13/02 | 446/158 |
| 4,135,326 A * | 1/1979 | Tong | A63H 13/12 | 446/158 |
| 4,277,908 A * | 7/1981 | Nikaido | A63H 23/10 | 446/158 |
| 4,314,423 A * | 2/1982 | Lipsitz | A63H 13/00 | 446/175 |
| 4,832,650 A * | 5/1989 | Tong | A63H 23/14 | 446/156 |
| 4,896,448 A * | 1/1990 | Jackson | A01M 31/06 | 43/3 |
| 5,136,800 A * | 8/1992 | Lanius | A01M 31/06 | 43/2 |
| 5,197,913 A * | 3/1993 | Suzuki | A63H 23/10 | 446/156 |
| 5,344,357 A * | 9/1994 | Lyczek | A63H 23/10 | 446/158 |
| 5,775,022 A * | 7/1998 | Sumrall | A01M 31/06 | 446/156 |
| 5,809,683 A * | 9/1998 | Solomon | A01M 31/06 | 43/3 |
| 5,926,990 A * | 7/1999 | Okimoto | A01M 31/06 | 43/2 |
| 5,930,936 A * | 8/1999 | Parr | A01M 31/06 | 43/3 |
| 5,931,715 A * | 8/1999 | Chang | A63H 13/02 | 446/353 |
| 5,989,091 A * | 11/1999 | Rodgers | B63C 11/205 | 446/175 |
| 6,138,604 A * | 10/2000 | Anderson | B63G 8/08 | 440/15 |
| 6,171,172 B1 * | 1/2001 | Foster | A63H 17/40 | 446/270 |
| 6,339,893 B1 * | 1/2002 | Solomon | A01M 31/06 | 43/3 |
| 6,339,894 B1 * | 1/2002 | Solomon | A01M 31/06 | 43/3 |
| 6,408,559 B2 * | 6/2002 | Mathews | A01M 31/06 | 43/3 |
| 6,449,894 B1 * | 9/2002 | Price, Sr. | A01M 31/06 | 43/3 |
| 6,484,431 B2 * | 11/2002 | Price, Sr. | A01M 31/06 | 43/3 |
| 6,493,980 B1 * | 12/2002 | Richardson | A01M 31/06 | 43/3 |
| 6,553,709 B1 * | 4/2003 | Owen | A01M 31/06 | 446/153 |
| 6,601,333 B2 * | 8/2003 | Cicoff | A01M 31/06 | 43/2 |
| 6,790,119 B1 * | 9/2004 | Chia | A63H 23/14 | 446/353 |
| 6,860,785 B2 * | 3/2005 | Vap | A63H 29/22 | 446/330 |
| 7,062,073 B1 * | 6/2006 | Tumey | A63H 3/28 | 446/175 |
| 7,347,759 B2 * | 3/2008 | Williams, Sr. | A63H 23/00 | 43/26.2 |
| 7,441,366 B2 * | 10/2008 | Van Houten, II | A01M 31/06 | 206/315.11 |
| 7,634,867 B2 * | 12/2009 | Bill | A01M 31/06 | 43/2 |
| 7,788,838 B2 * | 9/2010 | Anthony | A01M 31/06 | 43/2 |
| 7,865,268 B2 * | 1/2011 | Valdivia y Alvarado | A01K 85/01 | 428/411.1 |
| 8,146,285 B1 * | 4/2012 | Jones | A01M 31/06 | 43/2 |
| 8,266,836 B2 * | 9/2012 | Ware | A01M 31/06 | 43/26.1 |
| 8,950,105 B2 * | 2/2015 | Thomas | A01K 85/01 | 43/42.31 |
| 9,108,115 B1 * | 8/2015 | Fung | A63H 13/005 | |
| 9,265,246 B2 * | 2/2016 | Thomas | A01M 31/06 | |
| 9,645,181 B2 * | 5/2017 | Mimlitch, III | A63H 23/04 | |
| 10,212,929 B2 * | 2/2019 | Janzen, Jr. | A01M 31/06 | |
| 10,478,738 B1 * | 11/2019 | Wong | A63H 23/10 | |
| 10,517,290 B2 * | 12/2019 | Young | A01M 31/06 | |
| 11,602,145 B1 * | 3/2023 | Higdon | A01M 31/06 | |
| 12,063,927 B2 * | 8/2024 | Priest | A01M 31/06 | |
| 12,408,658 B1 * | 9/2025 | Campbell | A01M 31/06 | |
| 12,414,557 B1 * | 9/2025 | Campbell | H04R 3/00 | |
| 2001/0049249 A1 * | 12/2001 | Tachau | A63H 27/02 | 446/397 |
| 2005/0144828 A1 * | 7/2005 | Lewis | A01M 31/06 | 43/3 |
| 2005/0160654 A1 * | 7/2005 | Cosciani | A01M 31/06 | 43/2 |
| 2007/0054591 A1 * | 3/2007 | Williams | A63H 31/08 | 446/156 |
| 2007/0254556 A1 * | 11/2007 | Whitaker | A63H 3/46 | 446/390 |
| 2008/0268744 A1 * | 10/2008 | Jones | A63H 17/004 | 446/466 |
| 2011/0094143 A1 * | 4/2011 | Ware | A01M 31/06 | 43/2 |
| 2012/0255214 A1 * | 10/2012 | Krocheski | A01M 31/06 | 43/3 |
| 2012/0276807 A1 * | 11/2012 | Cabrera | A63H 29/22 | 60/527 |
| 2014/0087623 A1 * | 3/2014 | Todokoro | A63H 23/10 | 446/158 |
| 2015/0208640 A1 * | 7/2015 | Marsh | A01M 31/06 | 43/3 |
| 2024/0000062 A1 * | 1/2024 | Noe | G01G 21/28 | |
| 2024/0114892 A1 * | 4/2024 | Bruns | A63H 23/10 | |
| 2025/0017199 A1 * | 1/2025 | Huang | A01M 29/10 | |

\* cited by examiner

BIOMIMETIC WATERFOWL

CROSS-REFERENCE TO RELATED APPLICATION

This application claims priority to Taiwanese Invention Patent Application No. 112125856, filed on Jul. 11, 2023, which is incorporated by reference herein in its entirety.

FIELD

The disclosure relates to a biomimetic fowl, and more particularly to a biomimetic waterfowl.

BACKGROUND

A rubber duck may often be seen to be floating on water when taking a bath or swimming in a pool. However, such rubber duck may only float on the water, and is not capable of swimming by itself or performing other actions such as interacting with a user.

SUMMARY

Therefore, an object of the disclosure is to provide a biomimetic waterfowl that can alleviate at least one of the drawbacks of the prior art.

According to an aspect of the disclosure, a biomimetic waterfowl includes a housing, two waterfowl legs, and a driving module. The waterfowl legs are spaced apart from each other in a left-right direction, and are mounted to a bottom portion of the housing in an up-down direction perpendicular to the left-right direction. Each of the waterfowl legs includes a first segment that is mounted to the housing and that is rotatable about a first axis parallel to the left-right direction, and a second segment that is rotatable about a second axis parallel to the left-right direction. The driving module is mounted to the housing and is configured to drive the waterfowl legs. Each of the waterfowl legs is movable between a retracted state, where the first segment extends forwardly from the housing and the second segment extends rearwardly from the first segment, and a propelling state, where the first segment extends rearwardly from the housing and the second segment extends rearwardly from the first segment.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
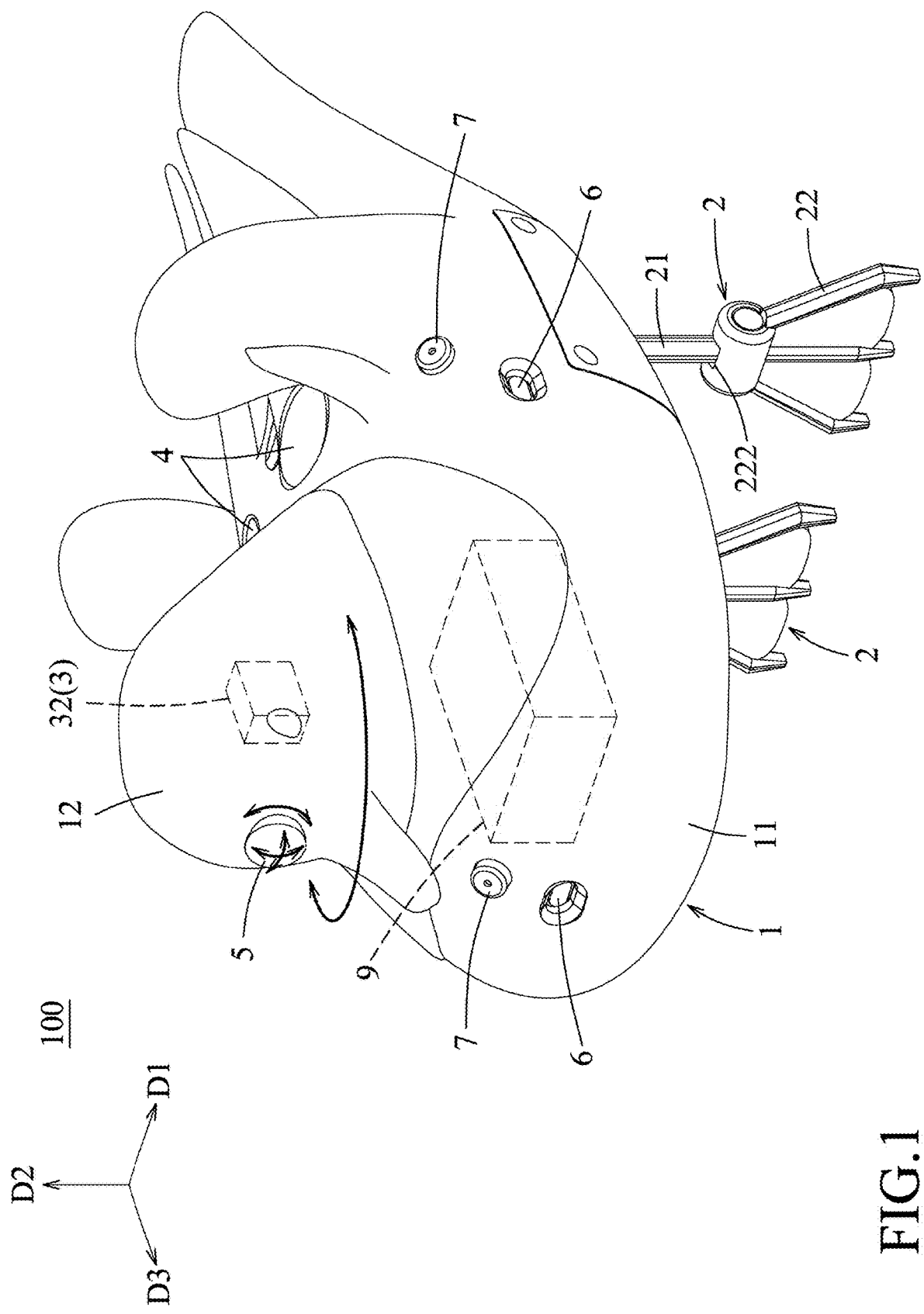
FIG. 1 is a perspective view a biomimetic waterfowl of an embodiment according to the present disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
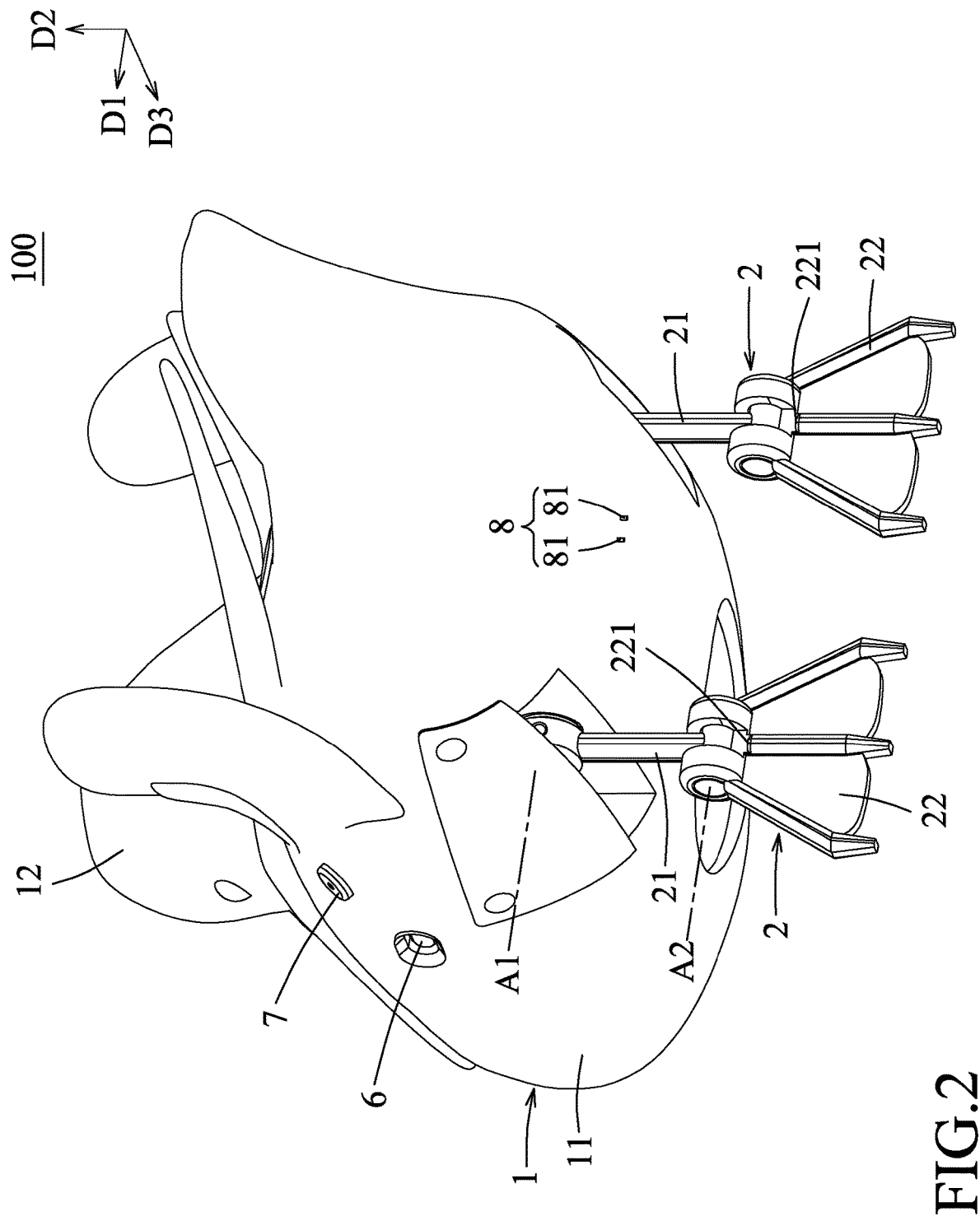
FIG. 2 is a perspective view of the embodiment of FIG. 1 from another view of angle different from FIG. 1.
Figure 3:
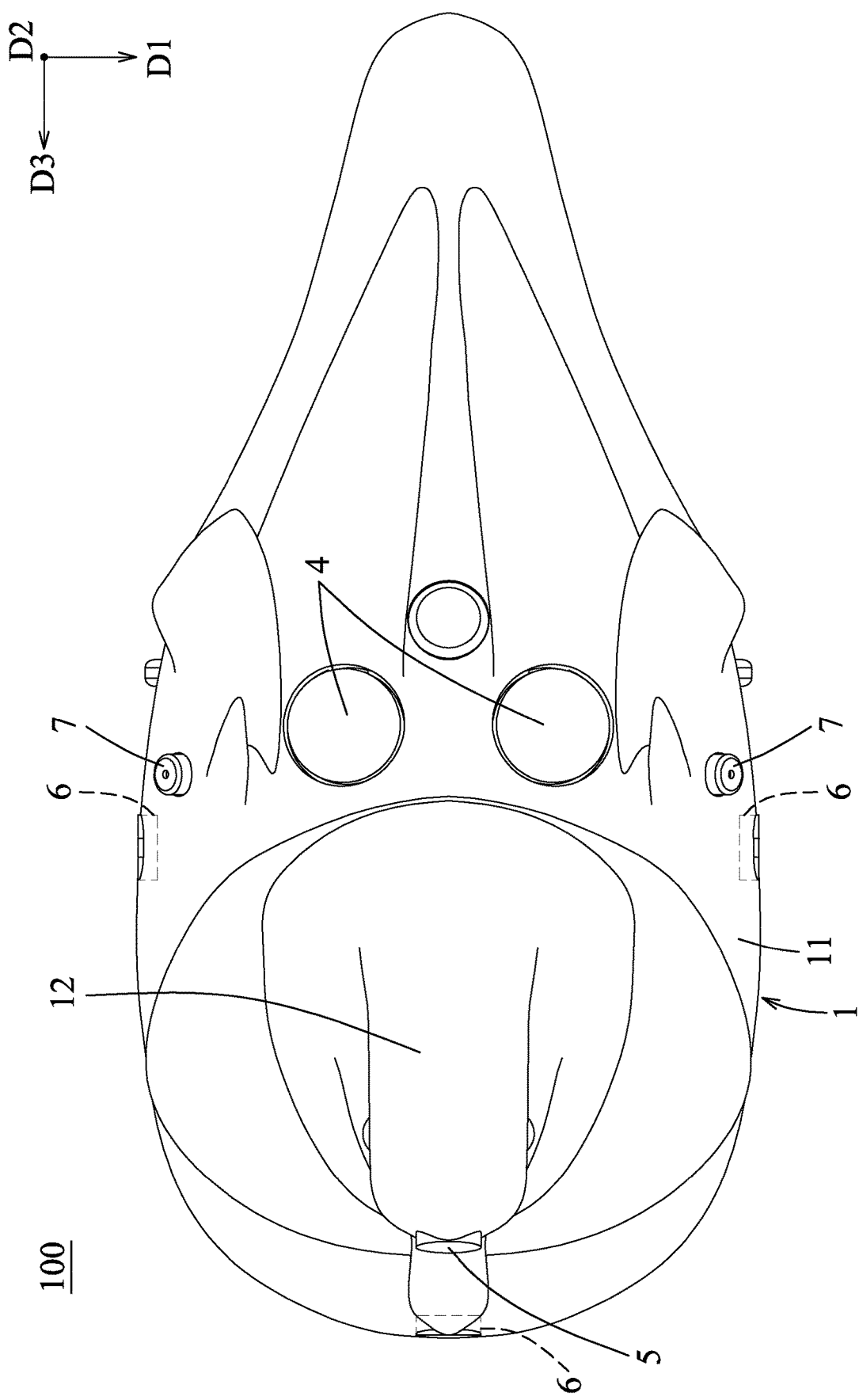
FIG. 3 is a top view of the embodiment.

Referring to FIGS. 1 to 3, a biomimetic waterfowl 100 of an embodiment according to the present disclosure is adapted to be floating on a water surface (not shown). The biomimetic waterfowl 100 includes a housing 1, two waterfowl legs 2, a driving module 3, a plurality of speakers 4, a camera module 5, a plurality of object sensors 6, a plurality of sound sensors 7, a water sensing module 8, and a microprocessor module 9.

The housing 1 may be made of, for example, plastic, and the housing 1 is substantially symmetric with respect to an axis extending in a front-rear direction (D3). The housing 1 includes a body portion 11 and a head portion 12 rotatably mounted on the body portion 11. Specifically, the head portion 12 is located on a top portion of the body portion 11 in an up-down direction (D2) perpendicular to the front-rear direction (D3), and the head portion 12 is oriented toward the front of the biomimetic waterfowl 100.

Figure 4:
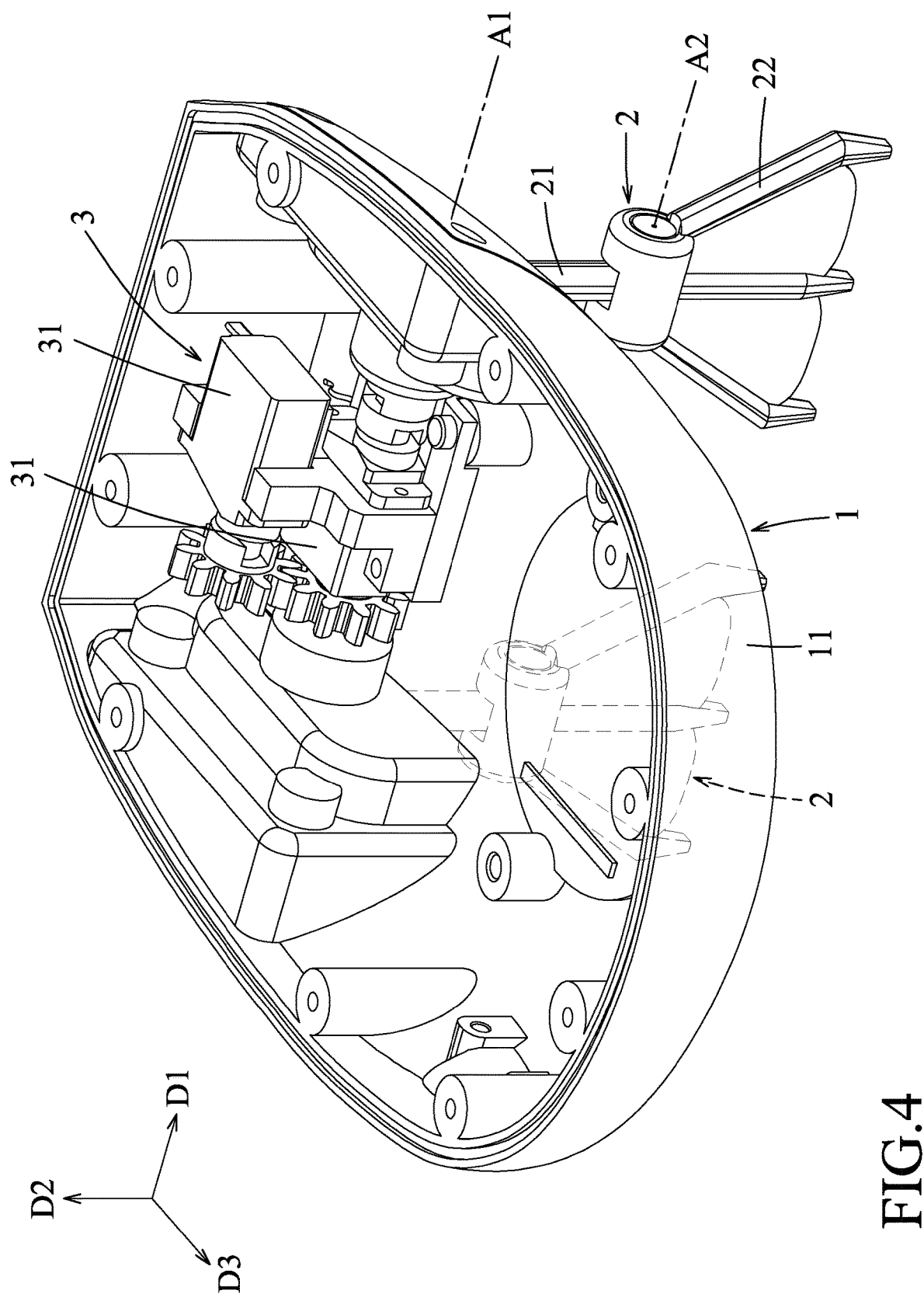
FIG. 4 is a fragmentary cutaway perspective view of the embodiment.

Referring to FIGS. 1, 2 and 4, the waterfowl legs 2 are spaced apart from each other in a left-right direction (D1) perpendicular to the up-down direction (D2) and the front-rear direction (D3), and are mounted to a bottom portion of the housing 1 in the up-down direction (D2). Each of the waterfowl legs 2 includes a first segment 21 that is mounted to the housing 1 and that is rotatable about a first axis (A1) parallel to the left-right direction (D1), and a second segment 22 that extends from an end of the first segment 21 distal from the housing 1 and that is rotatable about a second axis (A2) parallel to the left-right direction (D1). Each of the waterfowl legs 2 is movable relative to the housing 1 between a retracted state (see FIG. 5) and a propelling state (see FIG. 6).

Figure 5:
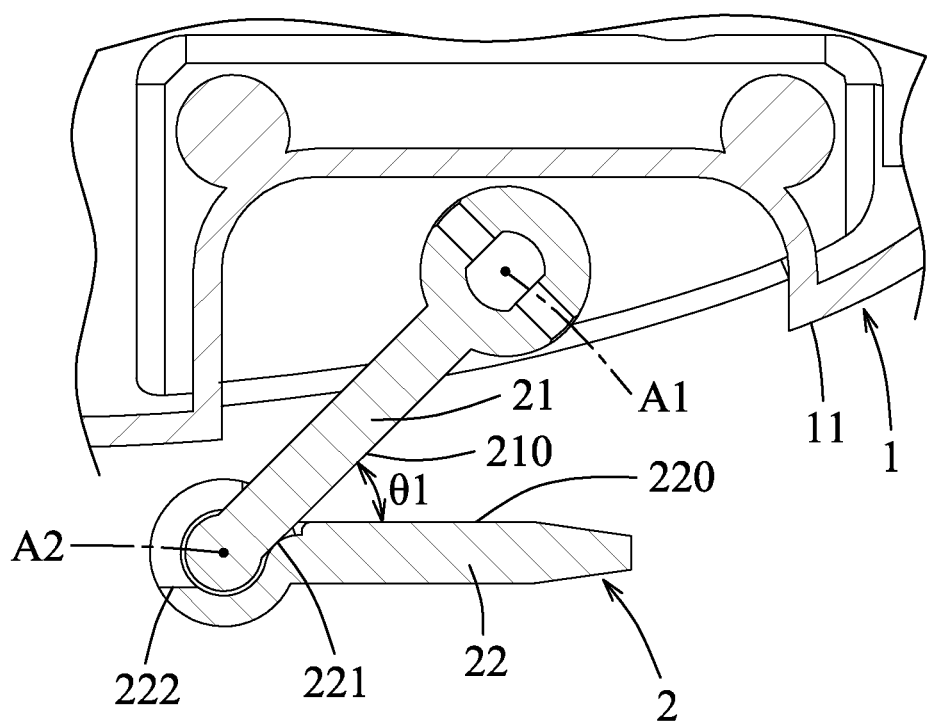
FIG. 5 is a fragmentary sectional view of the embodiment, illustrating a waterfowl leg of the biomimetic waterfowl of the embodiment in a retracted state.

In the following description, since the structure of each of the waterfowl legs 2 is identical, only one of the waterfowl legs 2 will be described for the sake of brevity. Further referring to FIGS. 5 to 6, the first segment 21 has a first angle-defining surface 210 facing rearwardly. The second segment 22 includes a first limiting portion 221 and a second limiting portion 222, and has a second angle-defining surface 220 cooperating with the first angle-defining surface 210 to define an included angle therebetween. As shown in FIG. 5, when the waterfowl leg 2 is in the retracted state, i.e., bent, the first segment 21 extends forwardly and downwardly from the housing 1 and the second segment 22 extends rearwardly from the first segment 21. In the retracted state, the first limiting portion 221 of the second segment 22 abuts against the first segment 21 such that the included angle is a minimum angle ($\theta 1$) formed between the first segment 21 and the second segment 22. It should be noted that, in the retracted state, water resistance urges the second segment 22 to extend rearwardly relative to the first segment 21.

Figure 6:
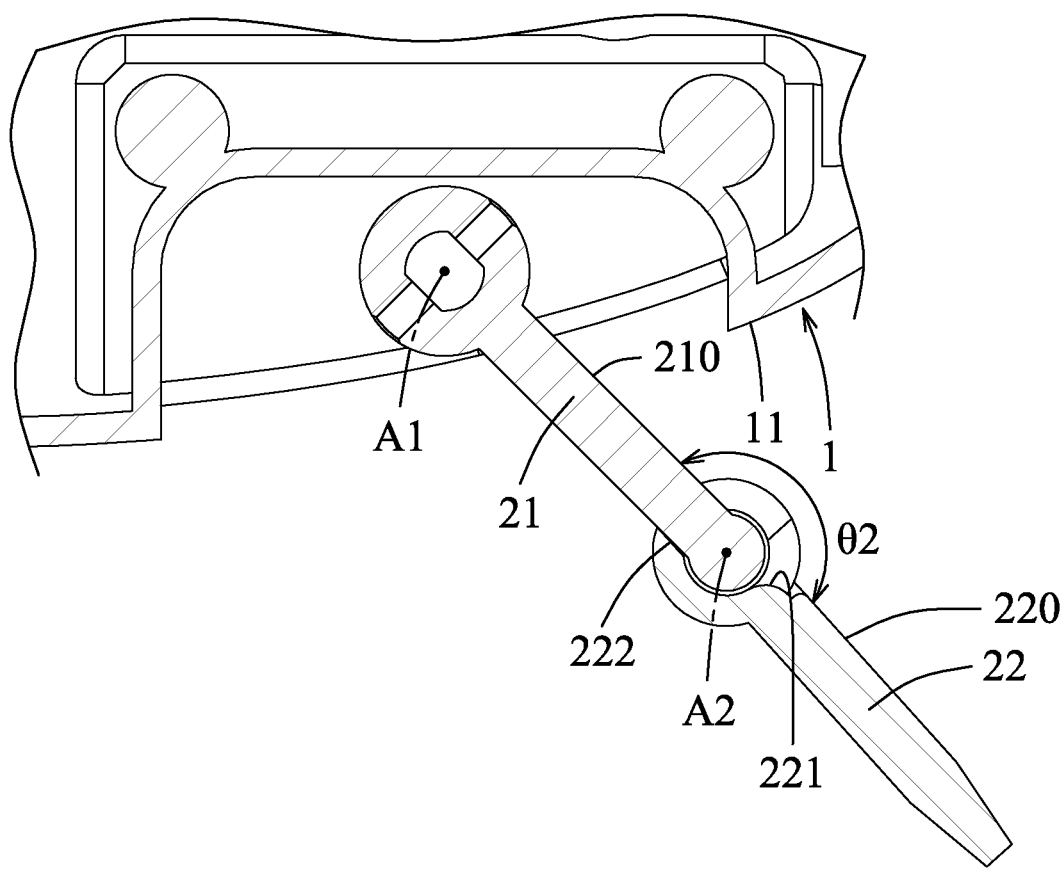
FIG. 6 is a fragmentary sectional view similar to FIG. 5, but illustrating the waterfowl leg in a propelling state.

As shown in FIG. 6, when the waterfowl leg 2 is in the propelling state, i.e., straight, the first segment 21 extends rearwardly and inclinedly from the housing 1, and the second segment 22 extends rearwardly and inclinedly from the first segment 21. In the propelling state, the second limiting portion 222 of the second segment 22 abuts against the first segment 21 such that the included angle is a maximum angle (θ2) formed between the first segment 21 and the second segment 22 and being greater than the minimum angle (θ1). It should be noted that, in the propelling state, the second segment 22 is moved by rearward movement of the first segment 21, which results from a reaction force exerted by water, thereby making the waterfowl leg 2 straight.

Referring to FIGS. 1 and 4, the driving module 3 is mounted in the housing 1, and is operable to drive the waterfowl leg 2 to move and to drive rotation of the head portion 12 relative to the body portion 11. In this embodiment, the driving module 3 includes two first drivers 31 for respectively driving the waterfowl legs 2, and a second driver 32 for driving the head portion 12. The two first drivers 31 and the second driver 32 are, e.g., servo motors.

When the waterfowl leg 2 moves between the retracted state and the propelling state, the water is moved rearwardly so a propelling force is generated and the biomimetic waterfowl 100 moves forwardly. Furthermore, since the waterfowl legs 2 are respectively driven by the first drivers 31, a travelling direction of the biomimetic waterfowls 100 may be controlled by changing frequencies of movements of the waterfowl legs 2, respectively.

Referring to FIGS. 1 and 3, the speakers 4 are mounted to a top surface of the body portion 11 of the housing 1. The camera module 5 is disposed on the head portion 12 of the housing 1, faces forwardly, and is for capturing a photographic information that includes a captured facial feature. The object sensors 6 are disposed on the body portion 11 of the housing 1, are distributed on a front surface and lateral surfaces of the body portion 11, and are configured to respectively output a plurality of distance signals. Each of the distance signals indicates a distance between the respective one of the object sensors 6 and an object sensed thereby. The sound sensors 7 are disposed on the body portion 11 of the housing 1, are distributed on the front surface and the lateral surfaces of the body portion 11, and are configured to respectively output a plurality of sound signals indicative of information of sounds respectively sensed thereby. The information of sound of each of the sound signals may be a position of a source of the sound. Referring to FIG. 2, the water sensing module 8 is disposed at the bottom portion of the body portion 11 of the housing 1, is configured to output an out-of-water sensing signal when the water sensing module 8 is out of the water. In this embodiment, the water sensing module 8 includes two conductive elements 81 disposed on an outer surface of the housing 1 and outputs the out-of-water sensing signal when an electrical conduction is not established between the conductive elements 81, which represents that the biomimetic waterfowl 100 is out of the water.

Figure 7:
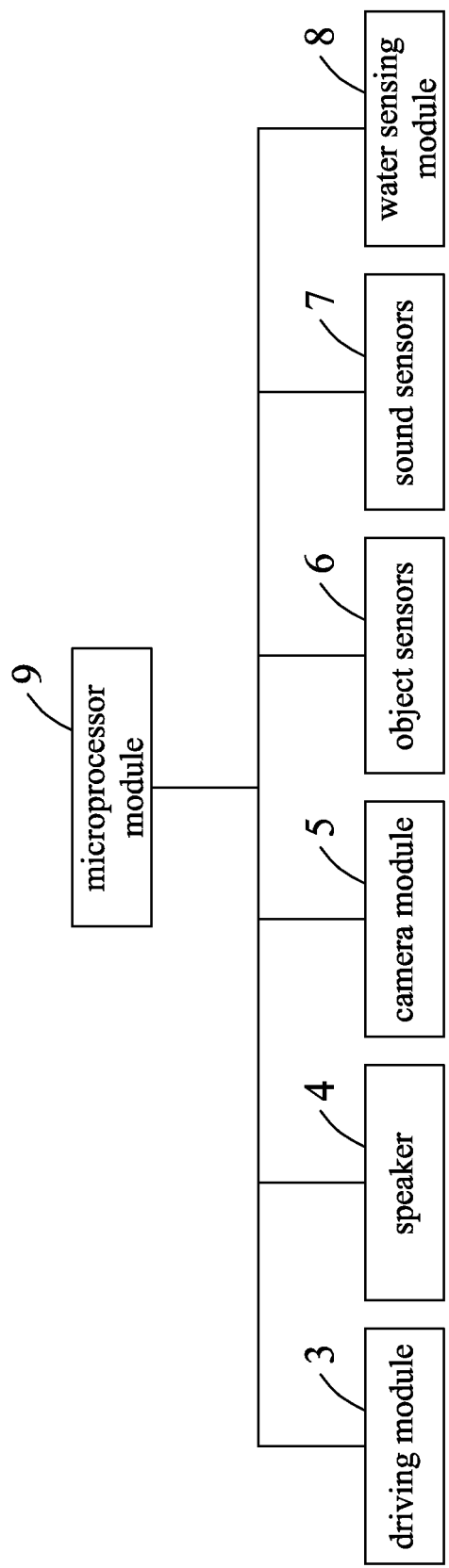
FIG. 7 is a schematic block diagram of the embodiment, illustrating connections among a microprocessor module and other components of the biomimetic waterfowl of the embodiment.

Referring to FIGS. 1 and 7, the microprocessor module 9 is disposed in the body portion 11 of the housing 1, and is electrically connected to the driving module 3, the speakers 4, the camera module 5, the object sensors 6, and the sound sensors 7, and the water sensing module 8.

The microprocessor module 9 is configured to output, upon receipt of the sound signals respectively from the sound sensors 7, a driving signal to the driving module 3 according to the sound signals to move the camera module 5 to face a source of the sounds for capturing the photographic information. In this embodiment, the driving module 3 moves the waterfowl legs 2 and the head portion 12 to face a position of the source of the sound according to the driving signals, e.g., based on a time difference of receipts of the sound signals. Furthermore, the microprocessor module 9 stores a facial identification data including a facial feature that matches with a user facial feature of a user of the biomimetic waterfowl 100. The microprocessor module 9 compares, upon receipt of the photographic information from the camera module 5, the captured facial feature of the photographic information with the facial feature stored therein, and outputs a face recognition signal to the driving module 3 indicative of a comparison result of the captured facial feature and the facial feature. The microprocessor module 9 is configured to output a sound playing signal to the speaker 4, according to the comparison result. For example, when the comparison result indicates that the captured facial feature of the photographic information matches with the facial feature stored in the microprocessor module 9, i.e., the source of sounds is the user, the microprocessor module 9 outputs the face recognition signal to the driving module 3 to move the biomimetic waterfowls 100 toward the user and outputs the sound playing signal to the speaker 4 to greet the user by playing a voice recording such as "Good day, master!" When the comparison result indicates that the captured facial feature of the photographic information does not match with the facial feature stored in the microprocessor module 9, the microprocessor module 9 does not output the face recognition signal to the driving module 3. In one embodiment, the microprocessor module 9 outputs another sound playing signal to the speaker 4 so the speaker 4 plays another voice recording such as "Hello!" In other embodiments, the microprocessor module 9 does not output a sound playing signal to the speaker 4 when the comparison result indicates that the captured facial feature does not match with the facial feature.

In addition, the microprocessor module 9 is configured to, upon receipt of the out-of-water sensing signal from the water sensing module 8, output one of an abnormal reaction signal to the driving module 3, an abnormal sound playing signal to the speaker 4, and a combination thereof when the face recognition signal indicates that the captured facial feature of the photographic information does not match with the facial feature stored in the microprocessor module 9. For example, in a case where the face recognition signal indicates that the captured facial feature does not match with the facial feature, i.e., a person who takes the biomimetic waterfowl 100 out of the water is not the user and may be a stranger stealing the biomimetic waterfowl 100, the microprocessor module 9 outputs the abnormal reaction signal to the driving module 3 to drive the two waterfowl legs 2 and the head portion 12 of the housing 1 to move quickly so as to emulate a distress response in panic, and outputs the abnormal sound playing signal to the speaker 4 so the speaker 4 may play an alerting voice recording such as "Help! Help!"

In addition, the microprocessor module 9 is configured to output a dodging signal to the driving module 3 upon receipt of the distance signals from the object sensors 6 according to the distance signals. When at least one of the distance signals satisfies a certain criteria, e.g., the distance between the respective one of the object sensors 6 and an object sensed thereby is smaller than a predetermined value, the microprocessor module 9 outputs the dodging signal to the driving module 3 so that the waterfowl legs 2 move the biomimetic waterfowl 100 away from the object and thus preventing the biomimetic waterfowl 100 from hitting an obstacle, i.e., the object, therearound. It should be noted that the microprocessor module 9 may include a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

In summary, by virtue of the waterfowl legs 2 which are movable between the retracted state and the propelling state and the driving module 3 which drives the waterfowl legs 2 to move, the biomimetic waterfowl 100 of the present disclosure is capable of moving autonomously in the water. Furthermore, the biomimetic waterfowl 100 includes the microprocessor module 9, a plurality of input interfaces (e.g., the camera module 5, the object sensors 6, the sound sensors 7, and the water sensing module 8), and a plurality of output interfaces (e.g., the driving module 3 and the speaker 4) that are electrically connected to the microprocessor module 9 and that are controlled thereby, so the biomimetic waterfowl 100 may interact with the user.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A biomimetic waterfowl comprising:
   a housing;
   two waterfowl legs that are spaced apart from each other in a left-right direction and that are mounted to a bottom portion of said housing in an up-down direction perpendicular to the left-right direction, each of said waterfowl legs including
   a first segment that is mounted to said housing and that is rotatable about a first axis parallel to the left-right direction, and
   a second segment that is rotatable about a second axis parallel to the left-right direction; and
   a driving module that is mounted to said housing and that is operable to drive said waterfowl legs,
   each of said waterfowl legs being movable between a retracted state, where said first segment extends forwardly from said housing and said second segment extends rearwardly from said first segment, and a propelling state, where said first segment extends rearwardly from said housing and said second segment extends rearwardly from said first segment;
   wherein said biomimetic waterfowl further comprises:
   a camera module disposed on said housing for capturing a photographic information that includes a captured facial feature, and
   a microprocessor module electrically connected to said driving module and said camera module, storing a facial identification data that includes a facial feature matching with a user facial feature of a user; and configured to compare, upon receipt of the photographic information from said camera module, the captured facial feature of the photographic information with the facial feature stored therein, and output a face recognition signal to said driving module indicative of a comparison result of the captured facial feature and the facial feature;
   a plurality of sound sensors mounted to said housing, configured to respectively output a plurality of sound signals indicative of information of sounds respectively sensed thereby, and electrically connected to said microprocessor module; and
   a speaker mounted to said housing and electrically connected to said microprocessor module,
   said microprocessor module configured to output, upon receipt of the sound signals respectively from said sound sensors, a driving signal to said driving module according to the sound signals to move said camera module to face a source of the sounds for capturing the photographic information, and to output a sound playing signal to said speaker, according to the comparison result of face recognition.

2. The biomimetic waterfowl as claimed in claim 1, wherein:
   when each of said waterfowl legs is in the retracted state, said waterfowl leg is bent, said first segment extends downwardly and inclinedly from said housing, and said second segment extends rearwardly from said first segment; and
   when each of said waterfowl legs is in the propelling state, said first segment extends downwardly and inclinedly from said housing and said second segment extends downwardly and inclinedly from said first segment.

3. The biomimetic waterfowl as claimed in claim 2, wherein:
   for each of said waterfowl legs, said first segment has a first angle-defining surface facing rearwardly, and said second segment includes a first limiting portion and a second limiting portion, and has a second angle-defining surface cooperating with said first angle-defining surface to define an included angle therebetween;
   when each of said waterfowl legs is in the retracted state, said first limiting portion of said second segment abuts against said first segment such that the included angle is a minimum angle formed between said first segment and said second segment; and
   when each of said waterfowl legs is in the propelling state, said second limiting portion of said second segment abuts against said first segment such that said included angle is a maximum angle formed between said first segment and said second segment and being greater than the minimum angle.

4. The biomimetic waterfowl as claimed in claim 1, wherein said driving module includes two first drivers for respectively driving said waterfowl legs to move.

5. The biomimetic waterfowl as claimed in claim 1, wherein:
said housing includes a body portion and a head portion rotatably mounted on said body portion; and
said driving module further includes a second driver for driving rotation of said head portion relative to said body portion.

6. The biomimetic waterfowl as claimed in claim 1, wherein said biomimetic waterfowls further comprises:
a plurality of object sensors mounted on said housing and configured to respectively output a plurality of distance signals, each of the distance signals indicating a distance between the respective one of said object sensors and an object sensed thereby; and
a microprocessor module electrically connected to said driving module and said object sensors, and outputting an dodging signal to said driving module upon receipt of the distance signals according to the distance signals.

7. A biomimetic waterfowl comprising:
a housing;
two waterfowl legs that are spaced apart from each other in a left-right direction and that are mounted to a bottom portion of said housing in an up-down direction perpendicular to the left-right direction, each of said waterfowl legs including
a first segment that is mounted to said housing and that is rotatable about a first axis parallel to the left-right direction, and
a second segment that is rotatable about a second axis parallel to the left-right direction; and
a driving module that is mounted to said housing and that is operable to drive said waterfowl legs,
each of said waterfowl legs being movable between a retracted state, where said first segment extends forwardly from said housing and said second segment extends rearwardly from said first segment, and a propelling state, where said first segment extends rearwardly from said housing and said second segment extends rearwardly from said first segment;
wherein said biomimetic waterfowl further comprises:
a camera module disposed on said housing for capturing a photographic information that includes a captured facial feature;
a microprocessor module electrically connected to said driving module and said camera module, storing a facial identification data that includes a facial feature matching with a user facial feature of a user, and configured to compare, upon receipt of the photographic information from said camera module, the captured facial feature of the photographic information with the facial feature stored therein, and output a face recognition signal to said driving module indicative of a comparison result of the captured facial feature and the facial feature;
a water sensing module disposed at said bottom portion of said housing, configured to output an out-of-water sensing signal when said water sensing module is out of water, and electrically connected to said microprocessor module; and
a speaker mounted to said housing, and electrically connected to said microprocessor module; and
wherein said microprocessor module is configured to, upon receipt of the out-of-water sensing signal, output 1) an abnormal reaction signal to said driving module, 2) an abnormal sound playing signal to said speaker, or 3) both 1) and 2), when the face recognition signal indicating that the captured facial feature of the photographic information does not match with the facial feature.

8. The biomimetic waterfowl as claimed in claim 7, wherein:
when each of said waterfowl legs is in the retracted state, said waterfowl leg is bent, said first segment extends downwardly and inclinedly from said housing, and said second segment extends rearwardly from said first segment; and
when each of said waterfowl legs is in the propelling state, said first segment extends downwardly and inclinedly from said housing and said second segment extends downwardly and inclinedly from said first segment.

9. The biomimetic waterfowl as claimed in claim 8, wherein:
for each of said waterfowl legs, said first segment has a first angle-defining surface facing rearwardly, and said second segment includes a first limiting portion and a second limiting portion, and has a second angle-defining surface cooperating with said first angle-defining surface to define an included angle therebetween;
when each of said waterfowl legs is in the retracted state, said first limiting portion of said second segment abuts against said first segment such that the included angle is a minimum angle formed between said first segment and said second segment; and
when each of said waterfowl legs is in the propelling state, said second limiting portion of said second segment abuts against said first segment such that said included angle is a maximum angle formed between said first segment and said second segment and being greater than the minimum angle.

10. The biomimetic waterfowl as claimed in claim 7, wherein said driving module includes two first drivers for respectively driving said waterfowl legs to move.

11. The biomimetic waterfowl as claimed in claim 7, wherein:
said housing includes a body portion and a head portion rotatably mounted on said body portion; and
said driving module further includes a second driver for driving rotation of said head portion relative to said body portion.

12. The biomimetic waterfowl as claimed in claim 7, wherein said biomimetic waterfowls further comprises:
a plurality of object sensors mounted on said housing and configured to respectively output a plurality of distance signals, each of the distance signals indicating a distance between the respective one of said object sensors and an object sensed thereby; and
a microprocessor module electrically connected to said driving module and said object sensors, and outputting an dodging signal to said driving module upon receipt of the distance signals according to the distance signals.

* * * * *